(12) United States Patent
Dunn

(10) Patent No.: US 8,069,591 B2
(45) Date of Patent: Dec. 6, 2011

(54) MULTI-PURPOSE BUCKET ARRANGEMENT

(76) Inventor: Jerauld Dunn, Iola, WI (US)

( * ) Notice: Subject to any disclaimer, the term of this patent is extended or adjusted under 35 U.S.C. 154(b) by 118 days.

(21) Appl. No.: 12/572,292

(22) Filed: Oct. 2, 2009

(65) Prior Publication Data
US 2011/0078930 A1 Apr. 7, 2011

(51) Int. Cl.
*E02F 3/96* (2006.01)
(52) U.S. Cl. .......................... 37/406; 414/724
(58) Field of Classification Search .............. 37/468, 37/446, 403–410, 443, 444, 903; 414/723, 414/724
See application file for complete search history.

(56) References Cited

U.S. PATENT DOCUMENTS

| | | | |
|---|---|---|---|
| 2,397,487 A * | 4/1946 | Holdeman et al. | 414/717 |
| 2,597,374 A * | 5/1952 | Richey | 414/724 |
| 2,612,280 A * | 9/1952 | Stueland | 414/722 |
| 2,860,794 A * | 11/1958 | Paluck | 414/715 |
| 2,993,608 A * | 7/1961 | Womble | 414/717 |
| 3,034,237 A * | 5/1962 | Wolfe et al. | 37/405 |
| 3,079,021 A * | 2/1963 | Kohorst et al. | 414/725 |
| 3,109,248 A | 11/1963 | Voss | |
| 3,148,787 A | 9/1964 | Clark et al. | |
| 3,163,945 A * | 1/1965 | Dooley | 37/405 |
| 3,214,041 A * | 10/1965 | Walberg | 414/724 |
| 3,349,933 A * | 10/1967 | Simpson et al. | 414/724 |
| 3,362,554 A * | 1/1968 | Fortier | 414/703 |
| 3,478,449 A | 11/1969 | Baker | |
| 3,706,388 A * | 12/1972 | Westendorf | 414/724 |
| 3,807,587 A | 4/1974 | Maurer | |
| 3,834,567 A * | 9/1974 | Miller | 414/724 |
| 3,842,999 A | 10/1974 | Asbury | |
| 3,845,870 A | 11/1974 | Balderson et al. | |
| 4,028,823 A | 6/1977 | Edwards et al. | |
| 4,055,222 A | 10/1977 | Runte | |
| 4,056,205 A * | 11/1977 | Etzler, IV | 414/722 |
| 4,086,712 A | 5/1978 | McReynolds | |
| 4,110,921 A | 9/1978 | Poker, Jr. | |
| 4,125,952 A * | 11/1978 | Jennings | 37/405 |
| 4,242,035 A * | 12/1980 | Hornstein | 414/724 |
| 4,395,193 A | 7/1983 | Christensen et al. | |
| 4,523,397 A | 6/1985 | Lucas | |
| 4,607,441 A | 8/1986 | Norton | |
| 4,616,433 A | 10/1986 | Knell et al. | |
| 4,865,372 A | 9/1989 | Gabriel | |
| RE33,198 E | 4/1990 | Ballinger | |
| 4,928,410 A | 5/1990 | Walters et al. | |
| 4,939,855 A | 7/1990 | McCreary, Jr. | |
| 5,018,283 A | 5/1991 | Fellner | |
| 5,094,581 A * | 3/1992 | Lamb | 414/24.5 |
| 5,209,002 A | 5/1993 | Tranquilli et al. | |
| 5,267,402 A | 12/1993 | Russell et al. | |
| 5,425,189 A | 6/1995 | Anderson et al. | |
| 5,564,885 A | 10/1996 | Staben, Jr. | |
| 5,639,205 A | 6/1997 | Kaczmarczyk et al. | |
| 5,695,310 A | 12/1997 | Foster et al. | |
| 5,992,062 A | 11/1999 | Evans et al. | |
| 6,092,606 A * | 7/2000 | Basler | 171/63 |

(Continued)

*Primary Examiner* — Thomas Will
*Assistant Examiner* — Mai Nguyen
(74) *Attorney, Agent, or Firm* — Thomas J. Nikolai; Nikolai & Mersereau, P.A.

(57) ABSTRACT

A multi-purpose attachment for work vehicles comprises a unique bucket shape and tine arrangement permitting the attachment to be used when performing a variety of jobs at a job site. The attachment may also include a thumb that can be extended over the open front of the bucket, retracted and even folded when not in use.

15 Claims, 6 Drawing Sheets

U.S. PATENT DOCUMENTS

| | | |
|---|---|---|
| 6,098,320 A | 8/2000 | Wass |
| 6,146,081 A * | 11/2000 | Anderson .................... 414/685 |
| 6,209,236 B1 * | 4/2001 | Omann ........................... 37/405 |
| 6,209,237 B1 * | 4/2001 | Heiple et al. ................... 37/406 |
| 6,260,294 B1 | 7/2001 | Pitcher |
| 6,267,547 B1 * | 7/2001 | Lund ............................ 414/697 |
| 6,357,993 B1 * | 3/2002 | Burton ......................... 414/724 |
| 6,401,831 B2 * | 6/2002 | Bouchard ....................... 171/46 |
| 6,434,863 B1 | 8/2002 | Meurer |
| 6,523,284 B1 | 2/2003 | Clugston |
| 6,546,650 B1 | 4/2003 | Meurer |
| 6,662,478 B1 | 12/2003 | Virnig |
| 6,718,662 B1 | 4/2004 | Schaff |
| 6,742,291 B2 | 6/2004 | Frigon et al. |
| 6,820,357 B1 | 11/2004 | Menard et al. |
| 6,910,290 B1 | 6/2005 | Meurer |
| 7,241,101 B2 | 7/2007 | Bauer et al. |
| 7,266,914 B2 * | 9/2007 | Grant ............................. 37/446 |
| 7,562,473 B2 | 7/2009 | Westendof et al. |
| 7,641,436 B2 * | 1/2010 | Wippel et al. ................ 414/724 |
| 2001/0048873 A1 * | 12/2001 | Perry ........................... 414/724 |
| 2004/0136822 A1 | 7/2004 | Ochoa |
| 2004/0208737 A1 | 10/2004 | Schmidtlein |
| 2006/0070268 A1 | 4/2006 | Westendorf et al. |
| 2008/0127532 A1 | 6/2008 | Reid |
| 2009/0074551 A1 | 3/2009 | Opperud |
| 2009/0077840 A1 | 3/2009 | Zeno et al. |
| 2009/0205847 A1 | 8/2009 | Benoit et al. |

* cited by examiner

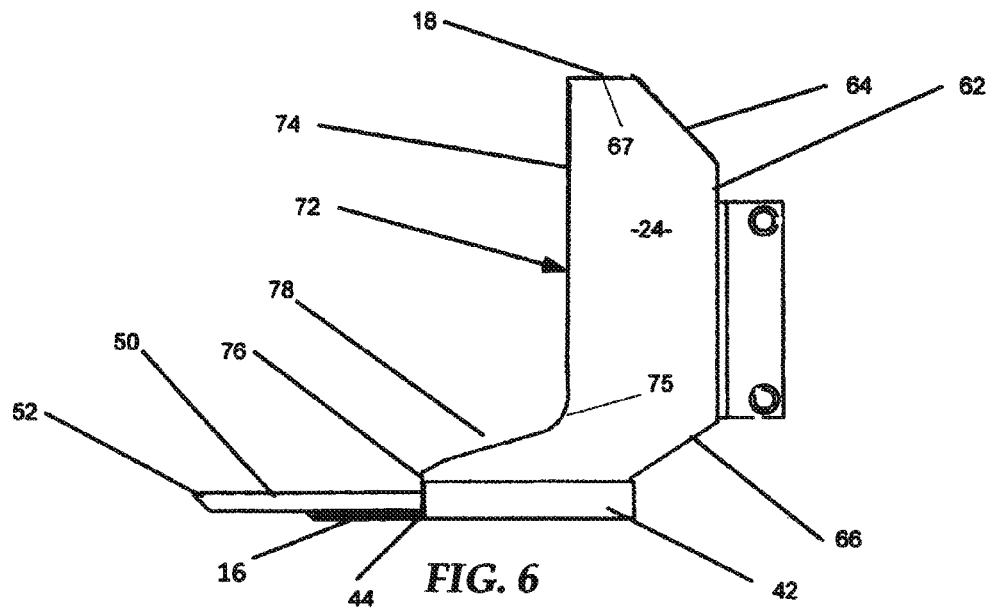
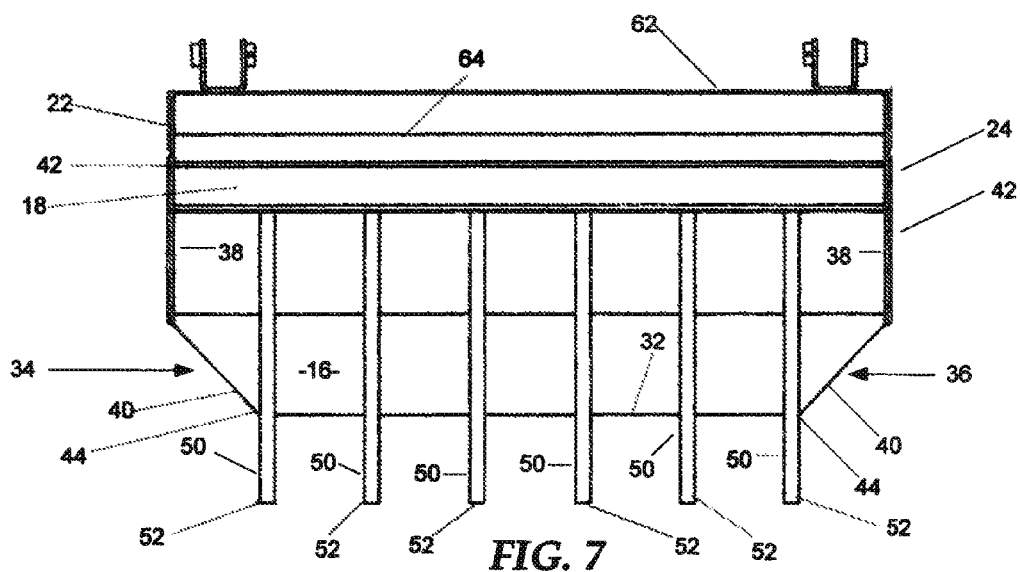

MULTI-PURPOSE BUCKET ARRANGEMENT

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to buckets used with work vehicles. More specifically, this invention relates to multi-purpose buckets used with work vehicles.

II. Related Art

Various work vehicles exist in the art. Such work vehicles include, without limitation, skid-steer loaders, back hoes, excavators, power shovels, front end loaders, tractors and the like. A variety of bucket attachments have been developed for use with such vehicles. However, such buckets typically are designed for a single purpose.

For example, some buckets are designed for excavating. See U.S. Pat. No. 6,546,650 to Meurer. Others are designed for grading. See U.S. Pat. No. 6,662,478 to Virnig. Still others are designed for digging. See U.S. Pat. No. 4,028,823 to Edwards et al; U.S. Pat. No. 5,018,283 to Fellner and U.S. Pat. No. 3,478,449 to Baker. Some are designed for dislodging (or moving) rocks, stumps and other large and bulky debris. See U.S. Pat. No. 6,098,320 to Wass and U.S. Pat. No. 4,607,441 to Norton. Others are designed for scooping and lifting. See U.S. Pat. No. 3,807,587 to Maurer. Still other are adapted for sue in hard materials such as rock strata, caliche, soapstone and plastic soils such as clay. See U.S. Pat. No. 4,476,641 to Ballinger. Some buckets are designed for ripping and trenching applications. See U.S. Pat. No. 4,616,433 to Knell et al. Still other buckets are designed for scraping or leveling the ground. See U.S. Pat. No. 7,562,473 to Westendorf et al; U.S. Pat. No. 6,434,863 to Meurer and U.S. Pat. No. 6,910,290 to Meurer.

The specialized nature of bucket attachments forces owners and operators of work vehicles to make a choice. They have to decide whether the work vehicle will be used for a single purpose or whether the work vehicle will be used for multiple purposes at various job sites. If the work vehicle is equipped with a single specialized bucket, several work vehicles may need to be transported and operated at the job site to complete the job. This can greatly increase the cost of the job and needlessly tie up expensive equipment. If the work vehicle will be used for multiple purposes, various specialty buckets will need to be transported to the job site to complete the job. The task of changing buckets, however, can lead to inefficiency and also increase the risk of job related injuries. This choice and the problems associated with each of the two options could be eliminated by providing a multi-purpose bucket suitable for performing multiple tasks such as excavating; grading; lifting; digging; dislodging rock, stumps and other debris; scooping and lifting; working with hard materials such as rock strata, caliche, soapstone and clay; ripping and trenching; and scraping and leveling. While other have developed multi-purpose attachments for work vehicles (see U.S. Pat. No. 6,820,357 to Menard et al and U.S. Pat. No. 5,564,885 to Staben, Jr.), these attachments have been limited in terms of the number of applications they can perform effectively and efficiently.

SUMMARY OF THE INVENTION

The present invention relates to work vehicle attachments adept at performing a variety of work related functions. These functions can all be performed by an open bucket having a suitable configuration comprising an open front, a bottom wall, a top wall, a back wall and a pair of side walls. The bottom wall of the bucket has a back edge, a front edge shorter than the back edge, and a pair of side edges. Each of the side edges have a first portion extending from the back edge in a direction normal to the back edge and a second portion extending at an angle from the first portion to an end of the front edge. The top wall of the bucket has a substantially rectangular shape. The front and back edges of the top wall are of substantially the same length as the back edge of the bottom wall. The side edges of the top wall are substantially shorter than the side edges of the bottom wall. A back wall and two side walls join the top wall and the bottom wall. The back wall extends between the back edges of the top wall and bottom wall. Each of the side walls have a top edge substantially co-extensive and joined to a side edge of the top wall, a back edge substantially co-extensive with and joined to a side edge of the back wall, and a bottom edge substantially co-extensive with and joined to the first portion of a side edge of the bottom wall. The front edge of each of the side walls has a first section extending substantially normal to the top wall. This first section extends from the top wall to a point more than two-thirds the distance from the top wall to the bottom wall. The front edge of each side wall also includes a second section extending substantially normal to the bottom wall from the bottom wall. A third section of the front edge of the side wall joints the first and second sections.

The attachment also includes a plurality of tines. The tines are joined to the bottom wall and each extends past and over portion of the front edge of the bottom wall. Each tine is spaced from the first portions of the side edges and the center of the front edge of the bottom wall.

In some embodiments of the invention, the attachment is joined to a pair of loader arms of a work vehicle. The loader arms each have a longitudinal axis and the tines are positioned so each tine resides between the longitudinal axes of the loader arms.

In some embodiments there is an even number of tines. In such embodiments, half the tines reside between the center of the bottom wall and one of the side walls and the other half of the tines reside between the center of the bottom wall and the other of the side walls. Likewise, in some embodiments the tines extend above the bottom wall. Some embodiments also include a length of angle iron along the back edge of the bottom wall.

The attachment can also include a thumb. Such a thumb comprises a movable member joined by a hinge connector to one of the walls of the bucket so the movable member is movable between a first position in which the movable member extends across the open front of the bucket and a second, retracted position. A ram such as a hydraulic or pneumatic ram can be used to pivot the movable member about the hinge connector between the first and second positions.

In some embodiments, the movable member of the thumb comprises first second and third arm segments. The second arm is connected at one of its ends by a hinge connector to an end of the first arm and at the other of its ends by a hinge connector to an end of the third arm. Hinge connectors are also provided to attach a midpoint of the first arm to a wall of the bucket and to attach the first arm to a ram. The hinge connectors joining the three arms permit the movable member of the thumb to be folded and unfolded with respect to each other. Locking pins may be used to secure the arms in the folded or unfolded positions.

The invention briefly described above is suitable for a number of tasks. The attachment is adept at digging and transplanting small trees and shrubs. The shape allows for carrying long objects. The construction allows for a smooth back dragging function. The arrangement of the tines allows them to be used for scarifying, captivating, prying, lifting, separating, moving and positioning of items. The arrangement of the tines also permits the apparatus to be used for setting poles (such as telephone poles) in holes. The arrangement of the tines and the bottom wall of the attachment also impedes movement and rolling of items (such as rocks) within the bucket as such items are being transported. The positioning of the tines also limits certain damaging forces that would otherwise be encountered by the loader arms.

These and other advantages of the present invention will be better appreciated from a reading of the detailed description of the invention in conjunction with the drawings provided as part of this specification.

BRIEF DESCRIPTION OF THE DRAWINGS

FIG. 6 is a side view of the attachment of FIG. 1;

FIG. 7 is a top view of the attachment of FIG. 1;

DETAILED DESCRIPTION

Figure 1:
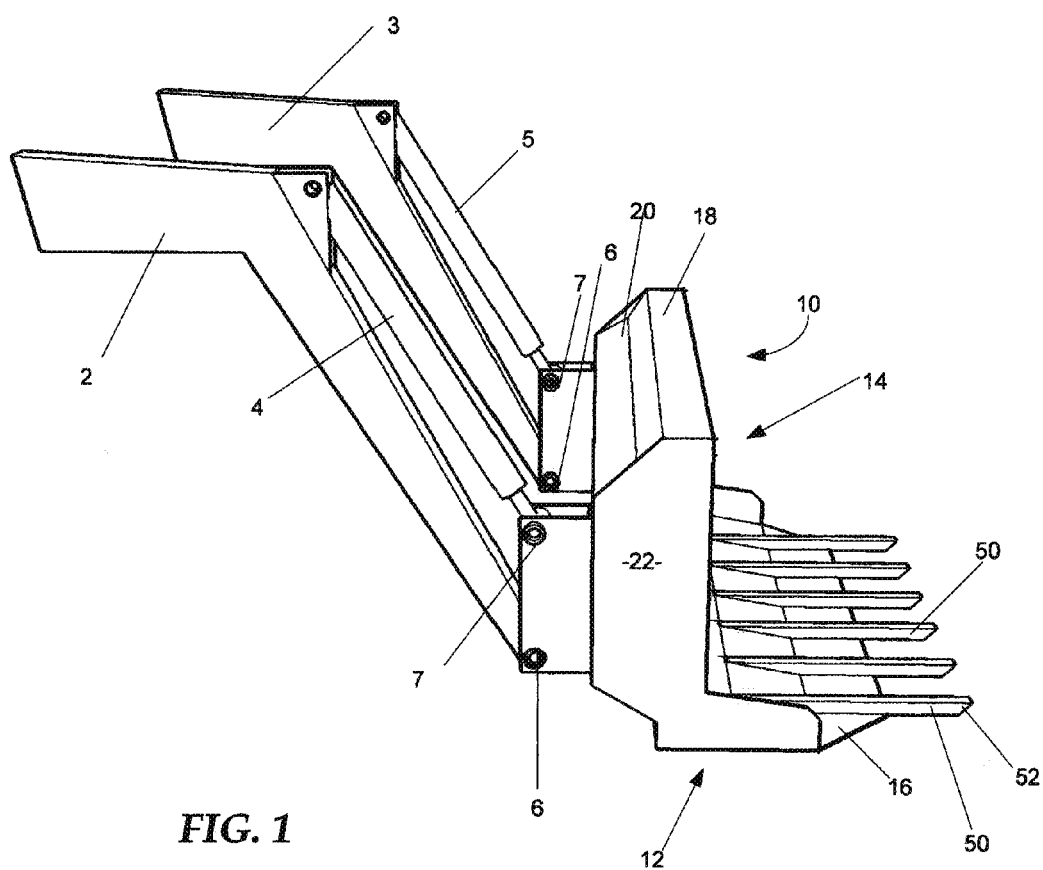
FIG. 1 is a perspective view showing a first embodiment of the attachment of the present invention attached to the loader arms of a work vehicle.
Figure 2:
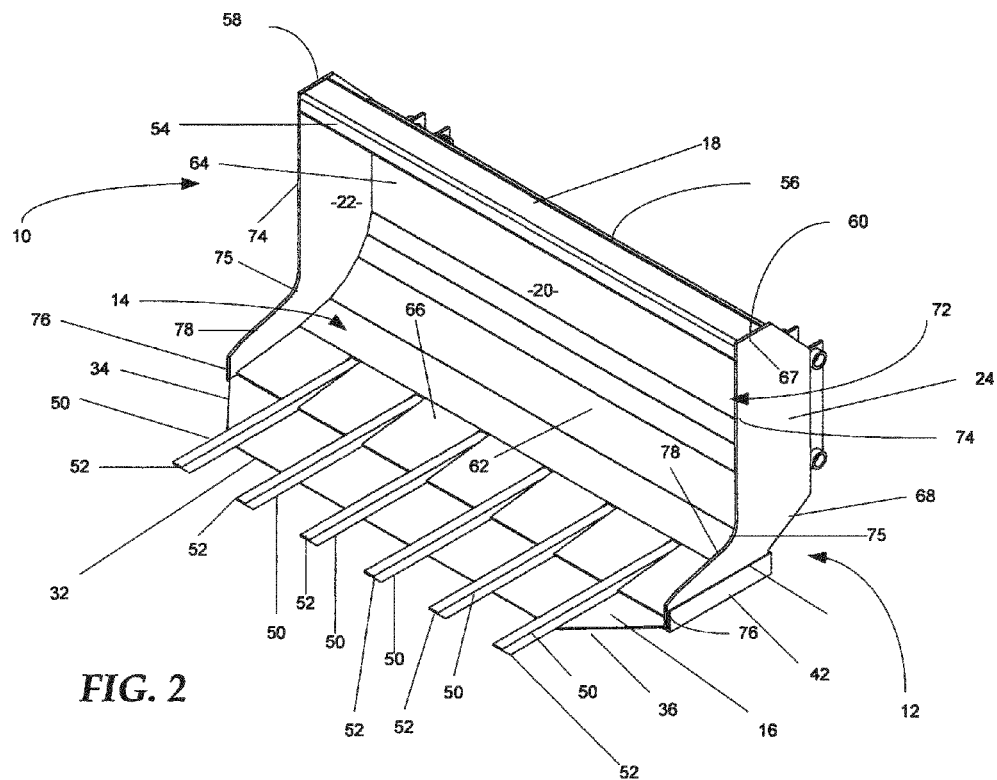
FIG. 2 is another perspective view showing generally the front of the embodiment of FIG. 1.
Figure 3:
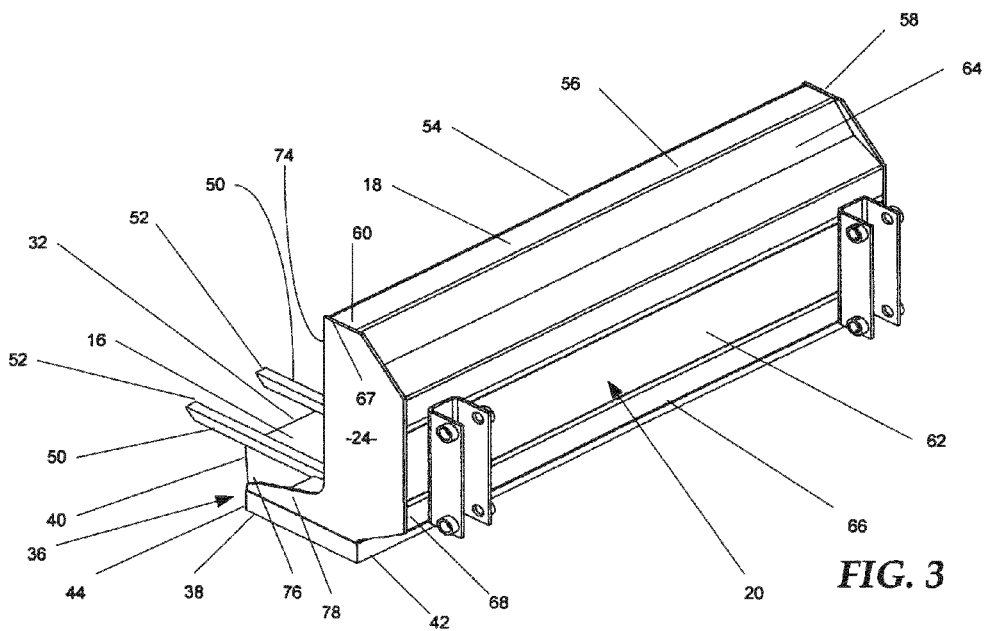
FIG. 3 is still another perspective view showing generally the back of the embodiment of FIG. 1.

FIG. 1 shows a pair of loader arms 2, 3 of a work vehicle (not shown). Associated with each loader arm is a hydraulic ram 4, 5. FIG. 1 also shows an attachment 10 secured to each of the loader arms 2, 3. More specifically, a pivot pin 6 is used to pivotally secure the distal end of each of the loader arms 2, 3 to the attachment 10. A pivot pin 7 is likewise used to pivotally secure the distal end of hydraulic rams 4, 5 to the attachment 10. This arrangement permits the attachment 10 to be not only raised and lowered by the loader arms 2, 3, but also be tilted with respect to the loader arms in a conventional fashion. Those skilled in the art should recognize the attachment 10 may be attached to a loader arm is any conventional manner without deviating from the invention. For this reason and to assist in better illustrating the invention, the loader arms 2, 3 and rams 4, 5 are not shown in the drawings other than in FIG. 1.

As will be explained with reference to FIGS. 2-7, the attachment 10 includes a bucket 12 having a unique shape and construction. Generally, the bucket 12 includes an open front 14, a bottom wall 16, a top wall 18, a back wall 20 and first and second side walls 22 and 24.

Figure 4:
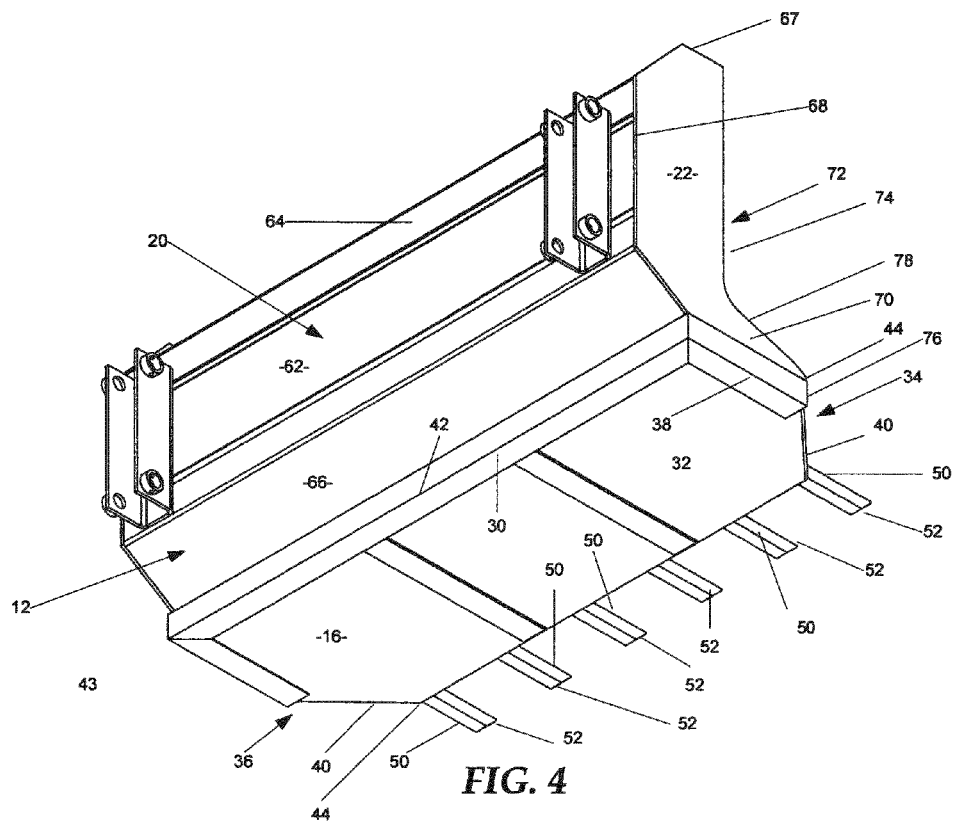
FIG. 4 is another perspective view showing generally the bottom of the embodiment of FIG. 1.
Figure 5:
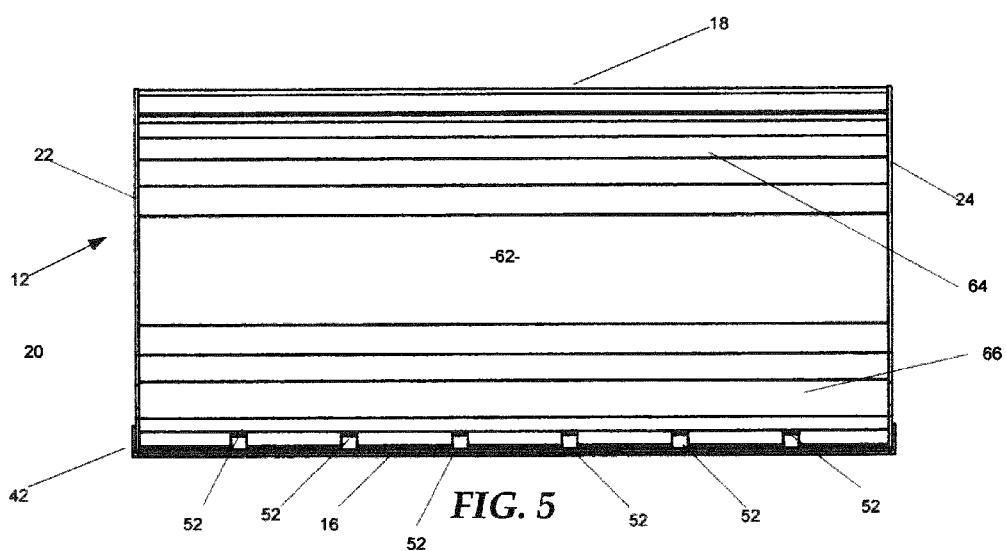
FIG. 5 is a front view of the attachment of FIG. 1.

The shape of bottom wall 16 is best shown in FIG. 4. The bottom wall 16 is essentially a plate having a back edge 30, a front edge 32, and side edges 34 and 36. Each side edge has a first portion 38 and a second portion 40. As shown, the front edge 32 is generally parallel to the back edge 30. The front edge 32, however, is substantially shorter than the back edge. For example, the back edge 30 could be four feet long and the front edge 32 could be three feet long. Typically, the front edge 32 will be about the same length or shorter than the distance between the loader arms 2, 3 of the work vehicle. The back edge 30 can either be secured to or comprise an L-shaped piece of angle iron 42.

The first portion 38 of each of the side edges 34, 36 extends in a substantially normal direction (i.e., substantially at a 90° angle) from an end of the back edge 30. The second portion 40 of each side edge 34, 36 connects the first portion 38 with the front edge 32. The angle 44 between the front edge and the second portion 40 of each side edge 34, 36 can vary. As shown, this angle is about 135°. This angle ideally (but not necessarily) is between 130° and 140°.

As shown in the drawings, the attachment also includes six tines 50. Each of the tines 50 is fastened to the top of the bottom wall 16, for example by welds. Each of the tines 50 extend from the back edge 30 of the bottom wall 16 past the front edge 32 of the bottom wall 16. The tines 50 each extend in a direction normal to, past and over a portion of the front edge 32 of the bottom wall 16. Further, the tines 50 are all located between the longitudinal axes of the loader arms 2, 3. Each of the tines 50 is spaced from the first portion 38 of the side edges 34, 36 of the bottom wall 16. Each of the tines 50 is also spaced from an imaginary line 51 parallel to the first portions 38 running through the center of the bottom wall 16. When an even number of tines are used, they are uniformly spaced and no tine resides along this imaginary center line. Each of the tines 50 extends well past the front edge 32 of the bottom wall 16 and terminates at an angled tip 52.

The top wall 18 of the bucket 12 has a substantially rectangular shape having a front edge 54 and a back edge 56 and a pair of side edges 58, 60. The front and back edges 54, 56 of the top wall 18 are approximately the same length as the back edge 30 of the bottom wall 16. The side edges 58, 60 of the top wall 16 are substantially shorter in length than the first portions 38 of the side edges 34, 36 of the bottom wall 16. As shown in the drawings, the side edges of the top wall 16 are about one-third the length to the first portion 38 of the side edges 34, 36 of the bottom wall 16. This can vary, but generally the side edges 58, 60 of the top wall 18 should be between one-quarter and one-half the length of the first portion 38 of the side edges 34, 36 of the bottom wall 16.

The back wall 20 extends between the bottom wall 16 and the back edge 56 of the top wall 18. The back wall 20 has a center section 62. As shown in the drawings, center section 62 is substantially shorter in length than the distance between the top wall 18 and bottom wall 16. The center section 62 also extends along a plane substantially normal to the planes of the top wall 18 and bottom wall 16. The back wall 20 also has a top section 64 extending between the center section 62 and the back edge 56 of the top wall 18. A bottom section 66 of the back wall 120 extends between the center section 62 and the bottom wall 16. The top section 64 and bottom section 66 can either be curved or angled with respect to the center section 62 to provide a bucket shape.

The side walls 22, 24 each have a top edge 67 substantially co-extensive with and joined to a side edge 58 or 60 of the top wall 18. The side walls 22, 24 also have a back edge 68 substantially co-extensive with and joined to a side edge of the back wall 20. The bottom edge 70 of each of side walls 58 and 60 is co-extensive with and joined to the first portion 38 of a side edge 34 of 36 of the bottom wall 16. The front edge 72 of each of side walls 22, 24 has a first section 74 extending down from the corner at which the front edge 54 and one of the side edges of the top wall intersect. The first section 74 of front edge 72 extends along a line substantially normal to the top wall 18 to a point 75. Point 75 is generally along a line parallel to the top wall and extending through the intersection between the center section 62 and bottom section 66 of the back wall 20. As shown in the drawings, the first section 74 extends more than three-fourths of the length between the top wall 18 and bottom wall 16, but this is not necessarily the case.

The front edge 72 of each side wall 22, 24 also has a second section 76. Section 76 extends upwardly from the intersection of the first portion 38 and second portion 40 of a side edge 34 or 36 of the bottom wall 16 in a direction substantially normal to the bottom wall 16.

Completing the front edge 72 of each side wall 22, 24 is a third section 78 extending between the bottom of the first section 74 and the top of the second section 76. While the angles between the third section and the first and second sections could be a right angle, as shown in the drawings, they are not. The lengths of first section 74 and second section 76 are such that the third section 78 is not at a right angle with respect to the first section 74 or the second section. Instead, the third section 78 slopes toward the bottom wall 16 as it extends away from the first section 74 toward the second section 76.

The construction of the bucket 12 and tines 50 described above offers numerous advantages. The tines can be used to loosen soil and the bucket used to remove the soil when trenching. The tine and bucket arrangement also makes the attachment 10 well suited when transplanting small trees and shrubs. The shape defined by the side walls 22, 24 and tines 50 make the attachment well suited for carrying long objects such as tree trunks, poles and lumber. The incorporation of an angle iron at the back edge of the bottom wall is highly beneficial when smoothing excavated ground. The spacing of the tines 50 allow the attachment 10 to be used effectively when scarifying, captivating, prying, lifting separating, moving or positioning items. The spacing of tines 50 also allows the attachment 10 to be used effectively for setting and orienting poles, posts, small trees or the like in holes. When carrying rocks or other objects the arrangement of the tines and walls of the bucket inhibits rolling of such items leading to greater stability and safety.

Figure 8:
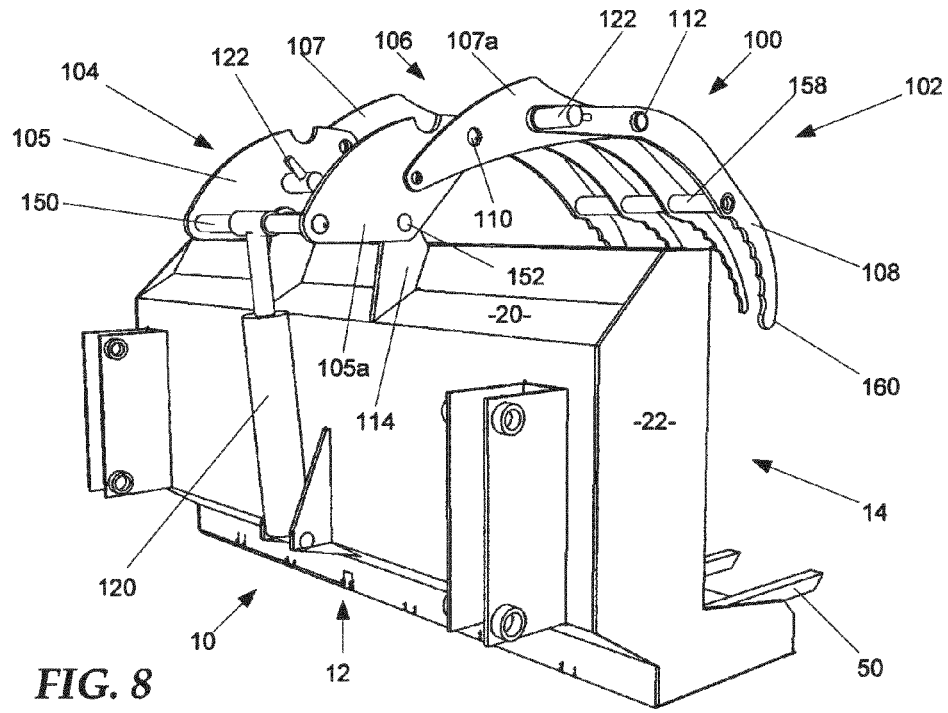
FIG. 8 is a perspective view of another embodiment of the attachment of the present invention.
Figure 9:
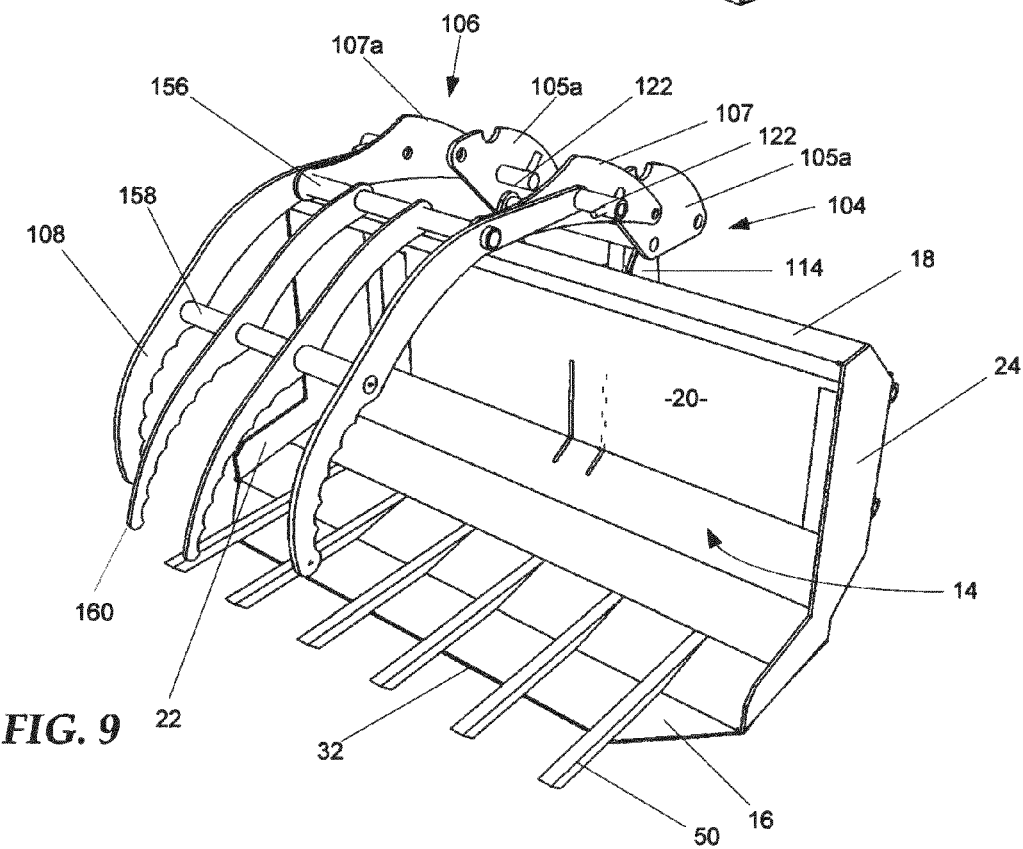
FIG. 9 is another perspective view of the embodiment of FIG. 8.
Figure 10:
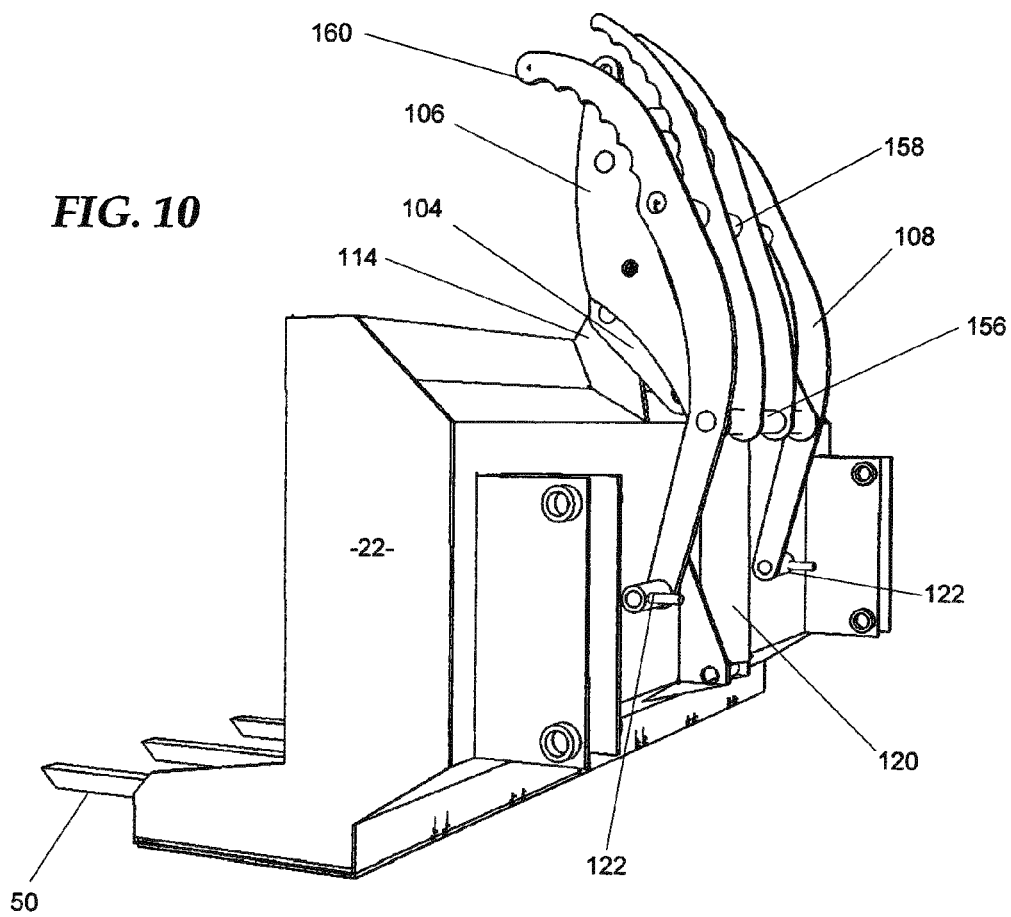
FIG. 10 is another perspective view of the attachment of FIG. 8 showing the thumb in a folded position for storage.

Safety and stability of objects carried by the attachment 10 can be even further enhanced if the thumb assembly 100 shown in FIGS. 8-10 is also provided as part of the attachment. The thumb 100 has a first position in which it crosses the open front 14 of the bucket 12 as shown in FIG. 9. The thumb 100 also has a second, retracted position above the open front 14. A third folded position is shown in FIG. 10.

The thumb 100 comprises a movable member 102 having a first arm 104, a second arm 106 and a third arm 108. One end of arm 106 is coupled by a hinge connector 110 to an end of the arm 104. The other end of arm 106 is coupled by a hinge connector 112 to arm 108. Further, the first arm 104 is connected at a midpoint by a hinge connector 114 to a wall of the bucket 12. The first arm 104 is also connected to a ram 120 used to pivot the movable member 102 between the first position across the open front 14 of the bucket 12 and the second, retracted position. The thumb 100 also includes one or more locking pins 122 used to lock the position of the arms 104, 105 and 108 either in the unfolded position shown in FIGS. 8 and 9 or the folded position shown in FIG. 10.

As best shown in FIGS. 8 and 9, the arms 104 and 106 each comprise a pair of parallel members 105 and 105a secured together by cross members. For example, one or more cross members join the parallel members of arm 104. One cross member 150 is located at the point where arm 104 is pivotally attached to the ram 120. Another cross member 152 can be used to pivotally attach arm 104 to hinge connector 114. A third cross member may be provided where the arm 104 is pivotally attached to arm 106 and serve as hinge connector 110. The parallel members 107 and 107a of arm 106 may be secured together by a cross member (such as 156) at hinge connectors 110 and 112.

As also shown in FIGS. 8 and 9, the arm 108 comprises four parallel members. These are joined by the cross member 156 at the location of hinge connector 112 and by a second cross member 158 at approximately the midpoint between the hinge connector 112 and the free end 160 of arm 108.

To lock arms 104, 106 and 108 in the unfolded position shown in FIGS. 8 and 9, a set of locking pins 122 which mate with alignable holes in two of the arms are provided. As shown in FIGS. 8 and 9, these pins 122 lock the position of arm 104 relative to arm 106, and arm 106 relative to arm 108. When these pins 122 are retracted (or removed), the arms 104, 106 and 108 can easily be folded into the position shown in FIG. 10.

The foregoing description is not intended to be limiting, but rather to explain attributes of the invention and how they can be implemented. The invention is only limited by the claims recited below.

What is claimed is:

1. An attachment for a work vehicle comprising:
   a. An open front,
   b. a bottom wall having a back edge extending between a first end and a second end, a front edge shorter than the back edge and extending substantially parallel to the back edge between a first and second end, a first side edge extending between the first end of the back edge and the first end of the front edge and a second side edge extending between the second end of the back edge and the second end of the front edge, each of said first and second side edges having a first portion extending from and normal to the back edge and a second portion extending from the front edge to the first portion at an angle between 130 and 140 degrees;
   c. a top wall having a substantially rectangular shape having a front edge and a back edge substantially the same length as the back edge of the bottom wall and side edges substantial between one-quarter and one half the length of the first portions of the side edges of the bottom wall,
   d. a back wall extending between the back edges of the top wall and the bottom wall, the back wall having a center section shorter in length than the distance between the top wall and the bottom wall and extending in a direction substantially normal to the top wall and the bottom wall, a top section extending between the back edge of the top wall and the top of a center section, and a bottom section extending between the back edge of the bottom wall and the bottom of the center section,
   e. a pair of opposing side walls, each side wall having a top edge substantially co-extensive with and joined to a side edge of the top wall, a back edge substantially co-extensive with and joined to a side edge of the back wall, a bottom edge substantially co-extensive with and joined to the first portion of a side edge of a bottom wall, and a front edge having a first section extending substantially normal to the top wall from the top wall to a point along a line substantially parallel to the top wall and extending through the intersection between the center and bottom sections of the back wall, a second section extending substantially normal to the bottom wall from the bottom wall, and a third section extending between the bottom of the first section and the top of the second section at an angle of at least 90 degrees from the first section, f. a plurality of tines joined to the bottom wall and extending normal to, past and over a portion of the front edge of the bottom wall, wherein some of said tines are located on one side of and spaced from a line equal distant from and parallel to the first portions of the side edges of the bottom wall and the remainder said tines are located on the other side of and spaced from said line so that no tine extends along said line, and g. a thumb comprising a first hinge connector, a movable member coupled to at least one of said walls by the first hinge connector for pivotal movement between a first position in which the movable member extends across said open front and a second retracted position, a ram for moving the movable member between the first and second positions, wherein the movable member includes arm segments secured to each other by a second hinge connector permitting the arm segments to be folded and unfolded.

2. The attachment of claim 1 further comprising first and second connecting members for connecting the attachment to the loader arms of a work vehicle, each of said loader arms having a longitudinal axis.

3. The attachment of claim 2 wherein the longitudinal axis of each tine is between the longitudinal axes of loader arms.

4. The attachment of claim 1 wherein the number of tines is an even number.

5. The attachment of claim 1 wherein the back edge of the bottom wall comprises a length of angle iron.

6. The attachment of claim 1 wherein each of said tines extends above the bottom wall.

7. An attachment for a work vehicle comprising:
a. An open front,
b. a bottom wall having a back edge extending between a first end and a second end, a front edge shorter than the back edge and extending substantially parallel to the back edge between a first and second end, a first side edge extending between the first end of the back edge and the first end of the front edge and a second side edge extending between the second end of the back edge and the second end of the front edge, each of said first and second side edges having a first portion extending from and normal to the back edge and a second portion extending from the front edge to the first portion at an angle between 130 and 140 degrees;
c. a top wall having a substantially rectangular shape having a front edge and a back edge substantially the same length as the back edge of the bottom wall and side edges substantial between one-quarter and one half the length of the first portions of the side edges of the bottom wall,
d. a back wall extending between the back edges of the top wall and the bottom wall, the back wall having a center section shorter in length than the distance between the top wall and the bottom wall and extending in a direction substantially normal to the top wall and the bottom wall, a top section extending between the back edge of the top wall and the top of a center section, and a bottom section extending between the back edge of the bottom wall and the bottom of the center section,
e. a pair of opposing side walls, each side wall having a top edge substantially co-extensive with and joined to a side edge of the top wall, a back edge substantially co-extensive with and joined to a side edge of the back wall, a bottom edge substantially co-extensive with and joined to the first portion of a side edge of a bottom wall, and a front edge having a first section extending substantially normal to the top wall from the top wall to a point along a line substantially parallel to the top wall and extending through the intersection between the center and bottom sections of the back wall, a second section extending substantially normal to the bottom wall from the bottom wall, and a third section extending between the bottom of the first section and the top of the second section at an angle of at least 90 degrees from the first section,
f. a plurality of tines joined to the bottom wall and extending normal to, past and over a portion of the front edge of the bottom wall, wherein some of said tines are located on one side of and spaced from a line equal distant from and parallel to the first portions of the side edges of the bottom wall and the remainder said tines are located on the other side of and spaced from said line so that no tine extends along said line, and a thumb comprising a first hinge connector, a movable member coupled to said wall by the first hinge connector for pivotal movement between a first position in which the movable member across said open front and a second retracted position, a ram for moving the movable member between the first and second positions, wherein the movable member included arm segments secured to each other by a second hinge connector permitting the arm segments to be folded and unfolded,
g. a movable member having first, second and third arms, said second arm connected at one of its ends by hinge connectors to one end of the first arm and at the other of its ends by a hinge connector to the second arm, said first arm further connected at its other end to a ram and at a midpoint by a hinge connector to one of the walls of the attachment, wherein said ram pivots said movable member between a first position crossing the open front and a second, retracted position, and the hinge connectors connecting the second arm to the first and third arms permit the arms to be folded and unfolded with respect to each other.

8. The attachment of claim 7 further including locking pins for locking the first, second and third arms in place with respect to each other in either a folded or unfolded condition.

9. An attachment for a work vehicle comprising:
a. An open front,
b. a bottom wall having a back edge extending between a first end and a second end, a front edge shorter than the back edge and extending substantially parallel to the back edge between a first and second end, a first side edge extending between the first end of the pack edge and the first end of the front edge and a second side edge extending between the second end of the back edge and the second end of the front edge, each of said first and second side edges having a first portion extending from and normal to the back edge and a second portion extending from the front edge to the first portion at an angle other than 180 degrees;
c. a top wall having a substantially rectangular shape having a front edge and a back edge substantially the same length as the back edge of the bottom wall and side edges substantial shorter than the side edges of the bottom wall, d. a back wall extending between the back edges of the top wall and the bottom wall;
e. a pair of opposing side walls, each side wall having a top edge substantially co-extensive with and joined to a side edge of the top wall, a back edge substantially co-extensive with and joined to a side edge of the back wall, a bottom edge substantially co-extensive with and joined to the first portion of a side edge of a bottom wall, and a front edge having a first section extending substantially normal to the top wall from the top wall to a point more than two-thirds the distance from the top wall to the bottom wall, a second section extending substantially normal to the bottom wall from the bottom wall, and a third section extending between the bottom of the first section and the top of the second section at an angle between 45 and 135 degrees from the first section,
f. a plurality of tines joined to the bottom wall and extending normal to, past and over a portion of the front edge of the bottom wall, wherein some of said tines are located on one side of and spaced from a line equal distant between and parallel to the first portions of the side edges of the bottom wall and the remainder said tines are located on the other side of and spaced from said line so that no tine extends along said line; and
g. a thumb comprising a movable member having first, second and third arms, said second arm connected at one of its ends by a hinge connector to one end of the first arm and at the other of its ends by a hinge connector to the second arm, said first arm further connected at its other end to a ram and at a midpoint by a hinge connector to one of the walls of the attachment, wherein said ram pivots said movable member between a first position crossing the open front and a second, retracted position, and the hinge connectors connecting the second arm to the first and third arms permit the arms to be folded and unfolded with respect to each other.

10. The attachment of claim 9 further including locking pins for locking the first, second and third arms in place with respect to each other in either a folded or unfolded condition.

11. The attachment of claim 9 further comprising first and second connecting members for connecting the attachment to the loader arms of a work vehicle, each of said loader arms having a longitudinal axis.

12. The attachment of claim 11 wherein the longitudinal axis of each tine is between the longitudinal axes of loader arms.

13. The attachment of claim 9 wherein the number of tines is an even number.

14. The attachment of claim 9 wherein the back edge of the bottom wall comprises a length of angle iron.

15. The attachment of claim 9 wherein each of said tines extends above the bottom wall.

* * * * *